(12) United States Patent
Nakamura et al.

(10) Patent No.: US 9,464,627 B2
(45) Date of Patent: Oct. 11, 2016

(54) HYDROGEN STORAGE CONTAINER (75) Inventors: Yoshinari Nakamura, Tokyo (JP); Takashi Kobayashi, Tokyo (JP)

(73) Assignee: KYB Corporation, Tokyo (JP)

( * ) Notice: Subject to any disclaimer, the term of this patent is extended or adjusted under 35 U.S.C. 154(b) by 380 days.

(21) Appl. No.: 14/129,058

(22) PCT Filed: Jun. 27, 2012

(86) PCT No.: PCT/JP2012/066377
§ 371 (c)(1),
(2), (4) Date: Dec. 23, 2013

(87) PCT Pub. No.: WO2013/005617
PCT Pub. Date: Jan. 10, 2013

(65) Prior Publication Data
US 2014/0205474 A1   Jul. 24, 2014

(30) Foreign Application Priority Data
Jul. 1, 2011 (JP) .................... 2011-147548

(51) Int. Cl.
*F17C 11/00* (2006.01)
*F04B 15/02* (2006.01)
(Continued)

(52) U.S. Cl.
CPC ............. *F04B 15/023* (2013.01); *F04B 9/042* (2013.01); *F04B 53/1002* (2013.01); *F17C 11/005* (2013.01); *Y02E 60/321* (2013.01)

(58) Field of Classification Search
CPC .. F04B 15/023; F04B 53/1002; F04B 9/042; F17C 11/00; F17C 11/005; Y02E 60/321
USPC ...................... 96/108, 146; 206/0.7; 429/515; 423/658.2
See application file for complete search history.

(56) References Cited

U.S. PATENT DOCUMENTS

| 3,251,410 A | | 5/1966 | Raskin | |
| 4,311,232 A | * | 1/1982 | Klatt | ............... C01B 3/0005 206/0.7 |
| 4,457,136 A | * | 7/1984 | Nishizaki | ............... C01B 3/0005 165/104.12 |

(Continued)

FOREIGN PATENT DOCUMENTS

| CN | 201363548 Y | 12/2009 |
| JP | 61-171998 | 8/1986 |

(Continued)

OTHER PUBLICATIONS

ISR for PCT/JP2012/066377 mailed Sep. 4, 2012.

(Continued)

*Primary Examiner* — Frank Lawrence
(74) *Attorney, Agent, or Firm* — Hauptman Ham, LLP (57) ABSTRACT

A hydrogen storage container that stores hydrogen gas using a hydrogen storage material capable of storing hydrogen gas includes: a hollow liner that stores the hydrogen gas and includes a liner opening portion into which the hydrogen gas is introduced; a hollow sub-tank disposed inside the liner to house the hydrogen storage material; a heat exchange pipe which is disposed inside the sub-tank and through which a heat exchange medium passes; a sub-tank support portion that supports an end portion of the sub-tank relative to the liner opening portion and supports an end portion of the heat exchange pipe; and a heat exchange medium passage that is formed to penetrate the sub-tank support portion and leads the heat exchange medium to the heat exchange pipe.

4 Claims, 4 Drawing Sheets

(51) Int. Cl.
*F04B 9/04* (2006.01)
*F04B 53/10* (2006.01)

(56) References Cited

U.S. PATENT DOCUMENTS

| | | | | |
|---|---|---|---|---|
| 4,609,038 | A * | 9/1986 | Ishikawa | C01B 3/0005 165/104.12 |
| 5,961,697 | A * | 10/1999 | McManus | B01D 53/0407 55/356 |
| 2005/0000970 | A1 | 1/2005 | Kimbara et al. | |
| 2005/0103196 | A1 * | 5/2005 | Wu | C01B 3/0005 96/134 |
| 2007/0062672 | A1 | 3/2007 | Toh et al. | |
| 2007/0246122 | A1 * | 10/2007 | Handa | F17C 13/12 141/82 |
| 2008/0142523 | A1 | 6/2008 | Sakaguchi et al. | |
| 2008/0203101 | A1 | 8/2008 | Kimbara et al. | |
| 2009/0000963 | A1 * | 1/2009 | Mori | C01B 3/0005 206/0.7 |
| 2010/0115970 | A1 * | 5/2010 | Lee | B82Y 30/00 62/46.1 |

FOREIGN PATENT DOCUMENTS

| | | |
|---|---|---|
| JP | 2004-286178 | 10/2004 |
| JP | 2008-151206 | 7/2008 |

OTHER PUBLICATIONS

Extended European Search Report issued Feb. 9, 2015, corresponding to European patent application No. 12806879.8.

* cited by examiner

HYDROGEN STORAGE CONTAINER

RELATED APPLICATIONS

The present application is based on International Application Number PCT/JP2012/066377, filed Jun. 27, 2012, and claims priority to Japanese Patent Application Number 2011-147548, filed Jul. 1, 2011.

TECHNICAL FIELD

This invention relates to a hydrogen storage container that stores hydrogen gas using a hydrogen storage material capable of storing hydrogen gas.

BACKGROUND ART

Conventionally, a hydrogen storage container is installed in a fuel cell automobile as a supply source of hydrogen gas serving as a fuel.

JP2008-151206A discloses a hydrogen storage container including a hollow liner that stores hydrogen gas and has a pair of liner opening portions through which the hydrogen gas is introduced, a sub-tank disposed inside the liner as a hollow cartridge main body in order to house a hydrogen storage material, and a heat exchange pipe wound spirally around an outer periphery of the sub-tank as a heat exchange flow pipe through which a heat exchange medium is led.

To charge the hydrogen gas into the hydrogen storage container, high-pressure hydrogen gas is supplied into the liner, and the heat exchange medium is supplied to the heat exchange pipe as a low-temperature cooling medium in order to cool the hydrogen storage material. In so doing, storage of the hydrogen gas in the hydrogen storage material is promoted.

To extract the hydrogen gas from the hydrogen storage container, on the other hand, high-temperature heat exchange medium is supplied to the heat exchange pipe in order to heat the hydrogen storage material. In so doing, discharge of the hydrogen gas from the hydrogen storage material is promoted.

SUMMARY OF INVENTION

In the conventional hydrogen storage container disclosed in JP2008-151206A, however, the heat exchange pipe is wound around the outer periphery of the sub-tank in a spiral shape. Hence, the heat exchange pipe and the sub-tank exist between the heat exchange medium and the hydrogen storage material, leaving room for improvement in a thermal control performance during cooling and heating of the hydrogen storage material.

Further, an end portion of the heat exchange pipe is connected to a pipe member provided in the liner by welding. Therefore, a connecting portion of the heat exchange pipe breaks easily when subjected to vibration or an impact from the outside.

This invention has been designed in consideration of the problems described above, and an object thereof is to improve a thermal control performance and a vibration resistance of a hydrogen storage container.

According to one aspect of this invention, a hydrogen storage container that is configured to store hydrogen gas using a hydrogen storage material capable of storing hydrogen gas is provided. The hydrogen storage container includes: a hollow liner that is configured to store the hydrogen gas and includes a liner opening portion into which the hydrogen gas is introduced; a hollow sub-tank disposed inside the liner to house the hydrogen storage material; a heat exchange pipe which is disposed inside the sub-tank and through which a heat exchange medium passes; a sub-tank support portion that supports an end portion of the sub-tank relative to the liner opening portion and supports an end portion of the heat exchange pipe; and a heat exchange medium passage that is formed to penetrate the sub-tank support portion and leads the heat exchange medium to the heat exchange pipe.

The details as well as other features and advantages of this invention are set forth in the remainder of the specification and are shown in the accompanying drawings.

DESCRIPTION OF EMBODIMENTS

Embodiments of this invention will be described below with reference to the figures.

First, referring to FIGS. 1 and 2, a configuration of a hydrogen storage container 1 according to an embodiment of this invention will be described. The hydrogen storage container 1 is installed in a vehicle that uses hydrogen gas as a fuel, for example, in order to storage high-pressure hydrogen gas.

The hydrogen storage container 1 includes a liner 2 serving as a hollow main tank into which the high-pressure hydrogen gas is charged, a hollow sub-tank 11 provided inside the liner 2, a hydrogen storage material 9 housed inside the sub-tank 11, and a heat exchange pipe 50 that cools and heats the hydrogen storage material 9. The hydrogen storage container 1 is a hybrid type container including both the liner 2 and the sub-tank 11. To facilitate understanding of an internal structure of the sub-tank 11, FIG. 1 shows a condition in which the hydrogen storage material 9 is not housed in the sub-tank 11.

A powdered hydrogen storage alloy, for example, is used as the hydrogen storage material 9 housed inside the sub-tank 11. The hydrogen storage alloy is an alloy capable of storing at least several hundred times the amount of hydrogen gas that can be stored in the atmosphere.

To charge hydrogen gas into the hydrogen storage container 1, the high-pressure hydrogen gas is supplied into the liner 2, and a heat exchange medium is supplied to the heat exchange pipe 50 as a low-temperature cooling medium in order to cool the hydrogen storage material 9. In so doing, storage of the hydrogen gas in the hydrogen storage material 9 is promoted.

To extract the hydrogen gas from the hydrogen storage container 1, on the other hand, a high-temperature heat exchange medium is supplied to the heat exchange pipe 50 in order to heat the hydrogen storage material 9. In so doing, discharge of the hydrogen gas from the hydrogen storage material 9 is promoted.

Water, for example, is used as the heat exchange medium supplied to the heat exchange pipe 50.

The hydrogen storage container 1 includes the hollow liner 2 into which the high-pressure hydrogen gas is charged, and a reinforcing sleeve 4 enveloping an outer peripheral surface of the liner 2.

The liner 2 includes a cylindrical liner trunk portion 21, and liner end portions 22 that throttle respective ends of the liner trunk portion 21 into dome shapes.

The liner end portions 22 respectively include liner shoulder portions 23 formed on the respective ends of the cylindrical liner trunk portion 21 so as to throttle the respective ends into dome shapes, and liner opening portions 24 that open in respective central portions of the liner shoulder portions 23.

The liner 2 is formed from an aluminum alloy, for example. In so doing, the liner 2 is prevented from becoming brittle even when an inner surface thereof is exposed to the hydrogen gas, and as a result, an anti-corrosion property is secured.

The reinforcing sleeve 4 is formed from high tensile steel, for example, as a metal having a greater tensile strength and a smaller thermal expansion coefficient than the liner 2.

The reinforcing sleeve 4 includes a cylindrical sleeve trunk portion 41 that is fitted to an outer peripheral surface of the liner trunk portion 21, and a pair of sleeve shoulder portions 42 that extend from respective end portions of the sleeve trunk portion 41 so as to contact the respective liner shoulder portions 23.

When hydrogen gas is charged into the hydrogen storage container 1, an internal pressure of the liner 2 increases such that the liner 2 attempts to expand. However, expansion of the liner 2 is suppressed by the reinforcing sleeve 4 surrounding the liner 2, and therefore internal stress generated into the liner 2 is reduced.

The hydrogen storage container 1 includes the pair of liner opening portions 24 that open at the respective ends of the liner 2 so that the hydrogen gas can be introduced therein, and a pair of sub-tank support portions 17 that support respective ends of the sub-tank 11 relative to the respective liner opening portions 24. The sub-tank 11 is supported in the liner 2 by the pair of sub-tank support portions 17 in a suspended condition. As a result, an annular interval 8 is formed between an outer peripheral surface of the sub-tank 11 and an inner wall surface of the liner 2.

Each sub-tank support portion 17 includes a plug 25 that is inserted into the liner opening portion 24 from the outside of the liner 2, a sub-tank support 30 that is inserted into the plug 25 from the inside of the liner 2, and a port block 35 that is attached to the plug 25 to introduce the hydrogen gas and the heat exchange medium.

Figure 2:
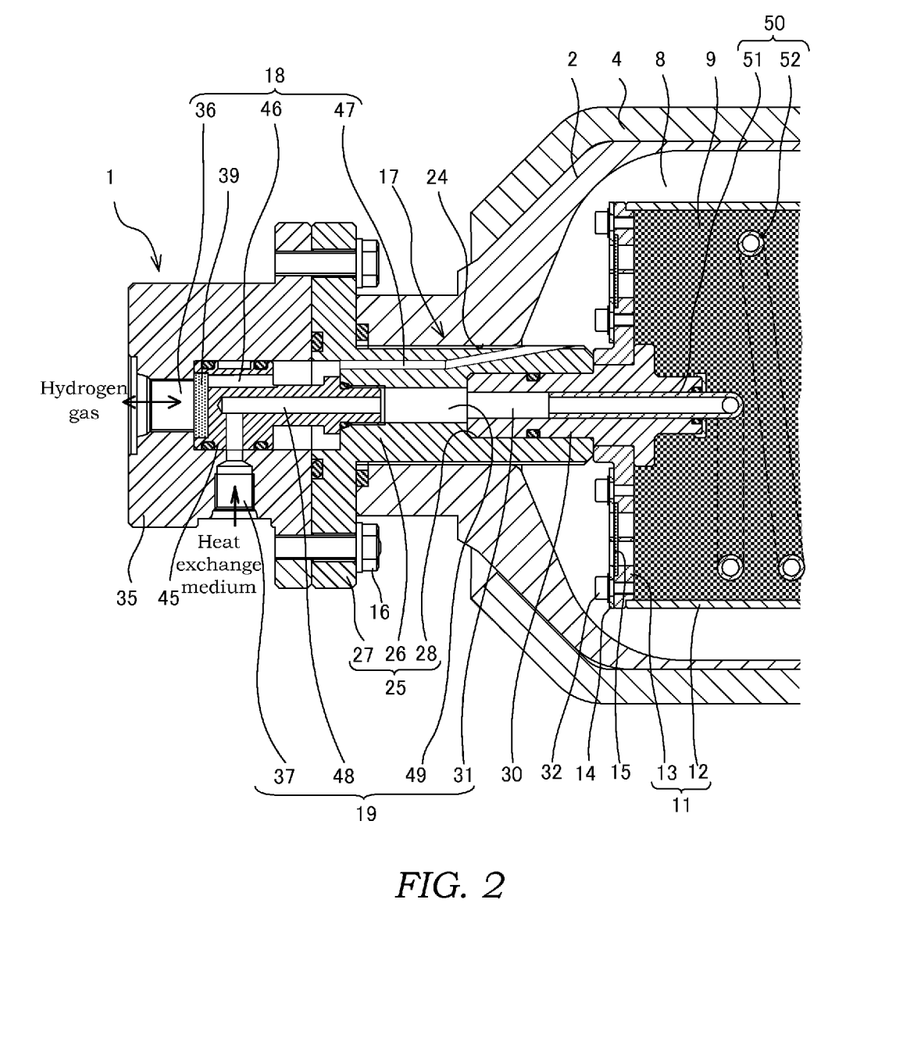
FIG. 2 is a sectional view showing a part of the hydrogen storage container according to this embodiment of this invention.

As shown in FIG. 2, the plug 25 includes a plug cylinder portion 26 that is inserted into the liner opening portion 24, and a plug flange portion 27 that contacts an end surface of the liner 2.

A male screw is formed on an outer periphery of the plug cylinder portion 26, and by screwing the male screw to a female screw, not shown in the figures, formed in the liner opening portion 24, the plug cylinder portion 26 is attached to the liner 2.

The plug cylinder portion 26 includes an attachment hole 28 opened in an end surface thereof. By inserting the sub-tank support 30 into the attachment hole 28, the sub-tank 11 is attached to the plug cylinder portion 26.

Figure 1:
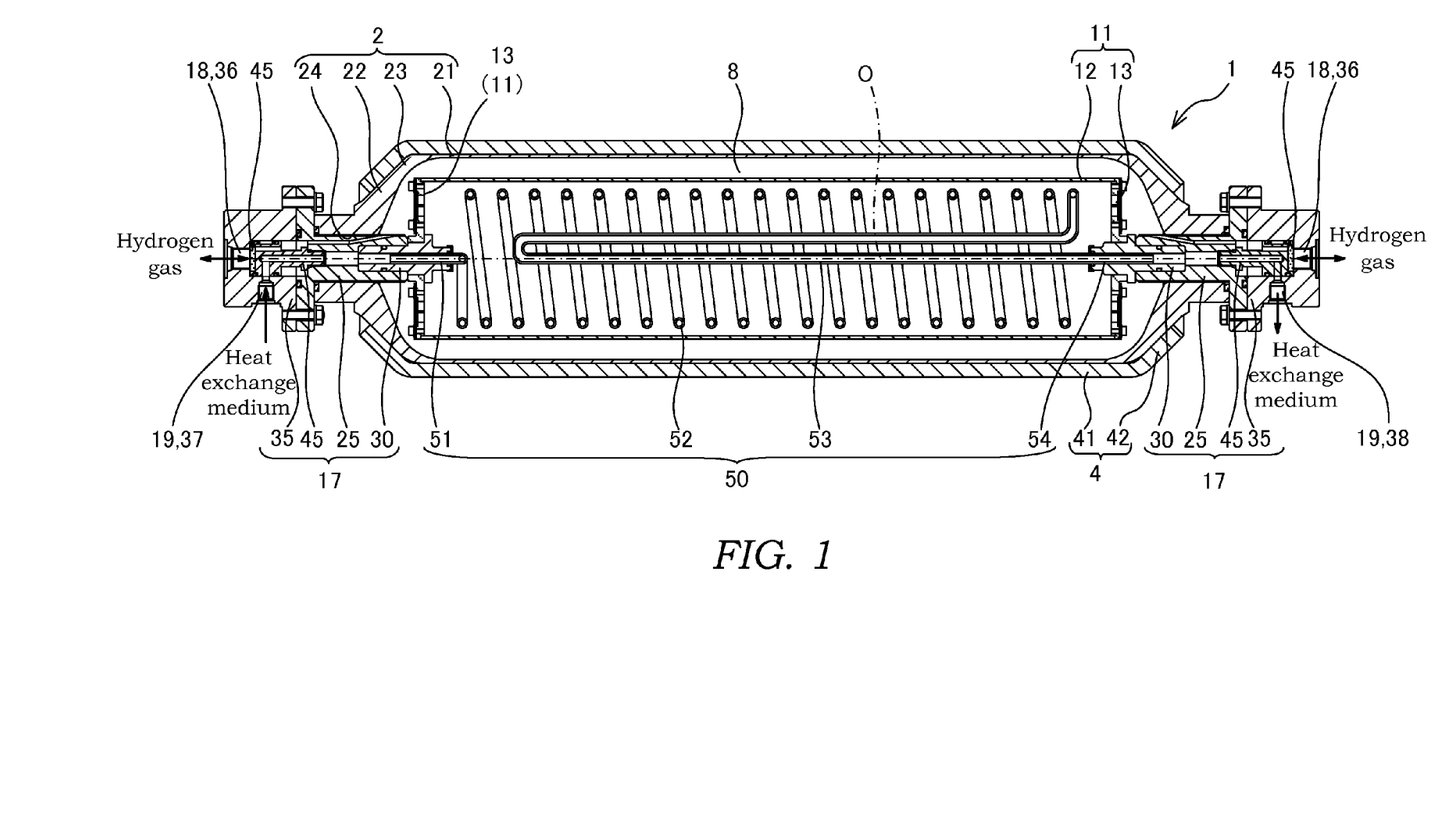
FIG. 1 is a sectional view of a hydrogen storage container according to an embodiment of this invention.

As shown in FIG. 1, the sub-tank 11 includes a cylindrical sub-tank trunk portion 12, a pair of sub-tank end portions 13 attached to respective ends of the sub-tank trunk portion 12, and the aforesaid sub-tank supports 30, which project outward from the respective sub-tank end portions 13 so as to be supported by the liner 2.

The sub-tank supports 30 are formed in a cylindrical shape and disposed on a center line O of the hydrogen storage container 1. The sub-tank supports 30 penetrate central portions of the respective disc-shaped sub-tank end portions 13, and are attached to the attachment holes 28 of the plug cylinder portions 26.

The liner 2 and the sub-tank 11 are formed to be substantially symmetrical about the center line O of the hydrogen storage container 1 when seen on the sectional view in FIG. 1.

A columnar space is defined inside the sub-tank trunk portion 12 between the respective sub-tank end portions 13. As shown in FIG. 2, the hydrogen storage material 9 is housed in this space together with the heat exchange pipe 50.

As shown in FIG. 2, a filter 15 through which the hydrogen gas passes is attached to each sub-tank end portion 13 via a perforated plate 14. The disc-shaped perforated plate 14 is fastened to the sub-tank end portion 13 by a plurality of bolts 32.

As shown in FIG. 1, a pipe base end portion 51 and a pipe tip end portion 54 forming respective end portions of the heat exchange pipe 50 are inserted respectively into through holes 31 formed in the respective sub-tank support portions 17. As a result, the heat exchange pipe 50 is supported in the sub-tank 11 in a suspended condition.

The heat exchange pipe 50 includes a pipe spiral portion 52 that bends from a tip end (a left side end portion in FIG. 1) of the pipe base end portion 51 projecting from the through hole 31 in the sub-tank support portion 17 and extends in a coil shape, and a pipe reciprocating portion 53 that bends from a tip end (a right side end portion in FIG. 1) of the pipe spiral portion 52 and extends in a U shape inside of the pipe spiral portion 52. A tip end (a right side end portion in FIG. 1) of the pipe reciprocating portion 53 serves as the pipe tip end portion 54 that is inserted into the through hole 31 in the sub-tank support portion 17.

The heat exchange pipe 50 is housed in the sub-tank 11 together with the hydrogen storage material 9. Hence, respective outer surfaces of the pipe spiral portion 52 and the pipe reciprocating portion 53 directly contact the hydrogen storage material 9.

The heat exchange pipe 50 is formed from a metallic material such as stainless steel, for example.

A hydrogen gas supply/discharge port 36 through which the hydrogen gas is supplied and discharged, as indicated by an arrow, and a heat exchange medium supply port 37 through which the heat exchange medium is supplied, as indicated by an arrow, are formed in the port block 35 positioned on the left side in FIG. 1. A pipe, not shown in the figures, through which the hydrogen gas passes is connected to the hydrogen gas supply/discharge port 36. A pipe, not shown in the figures, through which the heat exchange medium passes is connected to the heat exchange medium supply port 37.

Meanwhile, the hydrogen gas supply/discharge port 36 through which the hydrogen gas is supplied and discharged, as indicated by an arrow, and a heat exchange medium discharge port 38 through which the heat exchange medium is discharged, as indicated by an arrow, are formed in the other port block 35 positioned on the right side in FIG. 1. A pipe, not shown in the figures, through which the hydrogen gas passes is connected to the hydrogen gas supply/discharge port 36. A pipe, not shown in the figures, through which the heat exchange medium passes is connected to the heat exchange medium discharge port 38.

As shown in FIG. 2, the port block 35 is fastened to the plug 25 by a plurality of bolts 16. A connector 45 is interposed between the port block 35 and the plug 25. A through hole 48 through which the heat exchange medium can pass and a through hole 46 through which the hydrogen gas can pass are formed in the connector 45. A filter 39 that removes impurities from the hydrogen gas passing between the through hole 46 and the hydrogen gas supply/discharge port 36 is interposed between the port block 35 and the connector 45.

Each sub-tank support portion 17 is provided with a hydrogen gas passage 18 through which the hydrogen gas enters and exits via the connector 45, and a heat exchange medium passage 19 through which the heat exchange medium enters and exits.

The hydrogen gas passage 18 is constituted by the hydrogen gas supply/discharge port 36, the through hole 46 in the connector 45, and a through hole 47 formed in the plug 25.

The heat exchange medium passage 19 is constituted by the heat exchange medium supply port 37, the through hole 48 in the connector 45, a through hole 49 formed in the plug 25, and the through hole 31 in the sub-tank support 30.

Next, a process for manufacturing the hydrogen storage container 1 will be described.

(1) The liner end portion 22 and the liner opening portion 24 are formed on one end of the straight cylinder-shaped liner 2 by throttling processing.

(2) The sub-tank 11 is interposed in the liner 2, and one end of the sub-tank 11 is supported in the liner opening portion 24 via the sub-tank support portion 17.

(3) The liner end portion 22 and the liner opening portion 24 are formed on the other end of the liner 2 by throttling processing.

(4) The other end of the sub-tank 11 is supported in the liner opening portion 24 via the sub-tank support portion 17.

(5) The straight cylinder-shaped reinforcing sleeve 4 is fitted to the outer periphery of the liner 2 by press-fitting, for example.

(6) The respective end portions of the reinforcing sleeve 4 fitted to the liner 2 are throttled by molding so as to align with the liner end portions 22.

By performing the processes described in (1) to (6), the hydrogen storage container 1 is manufactured.

Next, charging and extraction of the hydrogen gas into and from the hydrogen storage container 1 will be described.

When hydrogen gas is charged into the hydrogen storage container 1, the high-pressure hydrogen gas supplied to the hydrogen gas supply/discharge ports 36 passes through the filters 39, the through holes 46 in the connectors 45, and the through holes 47 in the plugs 25, and then flows into the liner 2. The hydrogen gas that flows into the liner 2 from the hydrogen gas passages 18 enters the inside of the sub-tank 11 through the interval 8, the perforated plates 14, and the filters 15, and is stored in the hydrogen storage material 9. Thus, the hydrogen gas is charged into the hydrogen storage container 1 from both ends thereof.

Further, when hydrogen gas is charged into the hydrogen storage container 1, the heat exchange medium supplied to the heat exchange medium supply port 37 as a low-temperature cooling medium is led into the heat exchange pipe 50 through the through hole 48 in the connector 45, the through hole 49 in the plug 25, and the through hole 31 in the sub-tank support 30. Accordingly, the heat exchange medium that is led to the pipe base end portion 51 of the heat exchange pipe 50 from the heat exchange medium passage 19 passes through the pipe spiral portion 52 and the pipe reciprocating portion 53. During this process, the heat exchange medium exchanges heat with the hydrogen storage material 9 via the heat exchange pipe 50, thereby cooling the hydrogen storage material 9.

As a result, storage of the hydrogen gas in the hydrogen storage material 9 is promoted. Having absorbed the heat of the hydrogen storage material 9, the heat exchange medium passes through the through hole 31 in the sub-tank support 30, the through hole 49 in the plug 25, and the through hole 48 in the connector 45 from the pipe tip end portion 54, and is then discharged through the heat exchange medium discharge port 38.

When hydrogen gas is extracted from the hydrogen storage container 1, on the other hand, the hydrogen gas in the liner 2 flows out into the hydrogen gas supply/discharge ports 36 through the through holes 47 in the plugs 25, the through holes 46 in the connectors 45, and the filters 39. Thus, the hydrogen gas stored in the hydrogen storage container 1 is extracted from both ends of the hydrogen storage container 1.

Further, when hydrogen gas is extracted from the hydrogen storage container 1, the high-temperature heat exchange medium supplied to the heat exchange medium supply port 37 is led to the heat exchange pipe 50 through the through hole 48 in the connector 45, the through hole 49 in the plug 25, and the through hole 31 in the sub-tank support 30. Accordingly, the heat exchange medium that is led to the pipe base end portion 51 of the heat exchange pipe 50 from the heat exchange medium passage 19 passes through the pipe spiral portion 52 and the pipe reciprocating portion 53. During this process, the heat exchange medium exchanges heat with the hydrogen storage material 9 via the heat exchange pipe 50, thereby heating the hydrogen storage material 9. As a result, discharge of the hydrogen gas from the hydrogen storage material 9 is promoted.

In this embodiment, the liner 2 includes the pair of liner opening portions 24, and the sub-tank 11 is supported by the liner opening portions 24 at both ends via the pair of sub-tank support portions 17. However, this invention is not limited to this configuration, and instead, the liner 2 may include a single liner opening portion 24 such that the sub-tank 11 is supported by the liner opening portion 24 in cantilever fashion via a single sub-tank support portion 17.

According to the embodiment described above, following actions and effects are obtained.

The hydrogen storage container 1 includes the hollow liner 2 that stores the hydrogen gas and includes the liner opening portion 24 through which the hydrogen gas passes, the hollow sub-tank 11 disposed inside the liner 2 to house the hydrogen storage material 9, the heat exchange pipe 50 which is disposed inside the sub-tank 11 and through which the heat exchange medium passes, the sub-tank support portion 17 that supports the end portion of the sub-tank 11 relative to the liner opening portion 24, and the heat exchange medium passage 19 that is formed to penetrate the sub-tank support portion 17 and leads the heat exchange medium to the heat exchange pipe 50. The pipe base end portion 51 of the heat exchange pipe 50 is supported by the sub-tank support portion 17.

Hence, in the hydrogen storage container 1, the outer surface of the heat exchange pipe 50 directly contacts the hydrogen storage material 9. Therefore, heat exchange is performed between the heat exchange medium and the hydrogen storage material 9 more efficiently than with a conventional device in which the heat exchange pipe is wound around the outer periphery of the sub-tank. As a result, a thermal control performance during cooling and heating of the hydrogen storage material 9 is improved.

The heat exchange pipe 50 is structured such that the pipe base end portion 51 is supported by the sub-tank support portion 17, and therefore, in comparison with a conventional device in which an open end of the heat exchange pipe is connected by welding, a connecting portion of the heat exchange pipe 50 can be prevented from breaking upon reception of vibration or an impact.

Further, in the hydrogen storage container 1, the liner 2 includes the pair of liner opening portions 24, the sub-tank 11 is supported by the liner opening portions 24 at both ends via the pair of sub-tank support portions 17, and the pipe base end portion 51 and the pipe tip end portion 54 of the heat exchange pipe 50 are supported by the respective sub-tank support portions 17.

Hence, the two end portions of the sub-tank 11 are supported respectively by the pair of sub-tank support portions 17, and the pipe base end portion 51 and the pipe tip end portion 54 of the heat exchange pipe 50 are supported respectively by the pair of sub-tank support portions 17. As a result, connecting portions between the sub-tank support portions 17 and the heat exchange pipe 50 can be prevented from breaking upon reception of vibration or an impact.

Next, referring to FIGS. 3 and 4, another embodiment will be described. It should be noted that embodiments to be described below are configured basically identically to the embodiment shown in FIGS. 1 and 2, and therefore only different parts will be described. Identical configurations to the above embodiment have been allocated identical reference numerals, and description thereof has been omitted.

Figure 3:
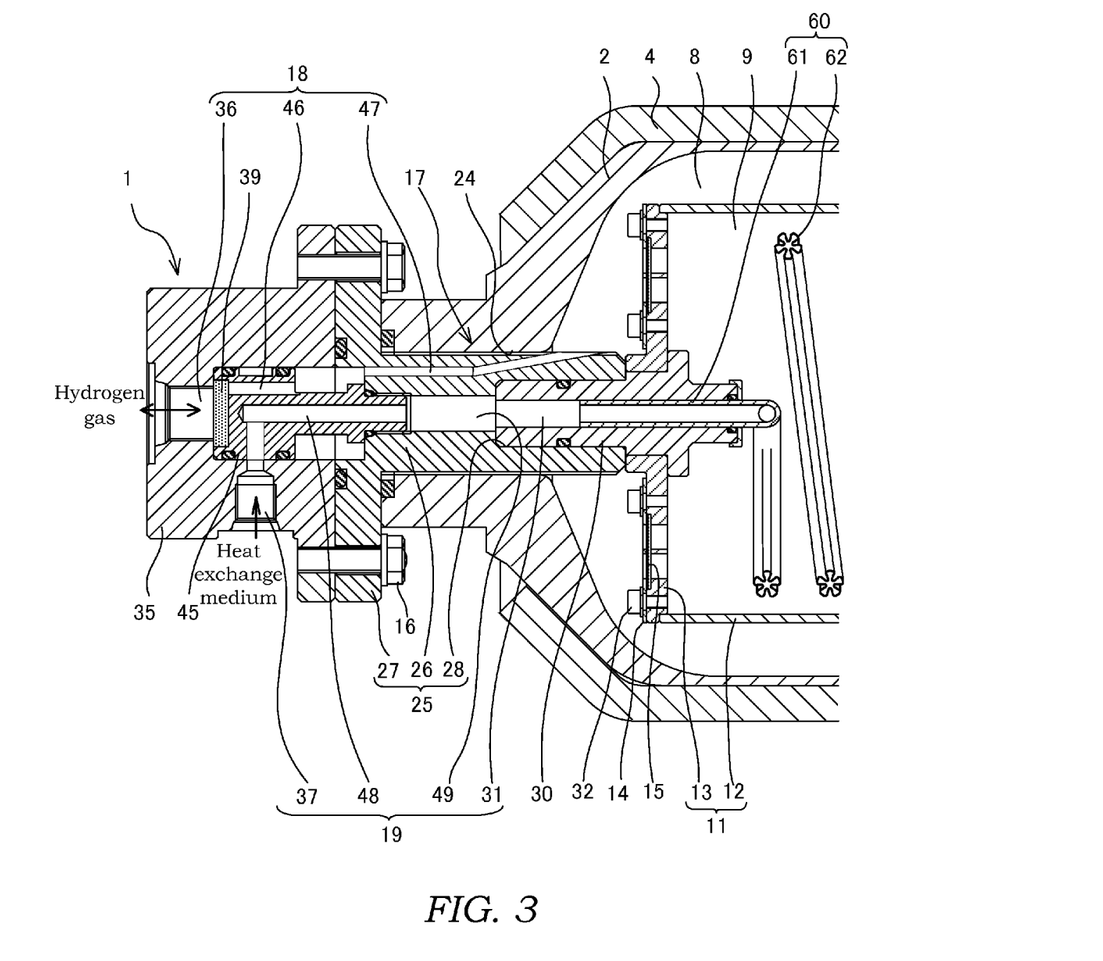
FIG. 3 is a sectional view showing a part of a hydrogen storage container according to another embodiment of this invention.

As shown in FIG. 3, a heat exchange pipe 60, similarly to the heat exchange pipe 50 of the above embodiment, includes a pipe base end portion 61 inserted into the through hole 31 in one of the sub-tank support portions 17, a pipe spiral portion 62 that bends from the pipe base end portion 61 and extends in a coil shape, a pipe reciprocating portion, not shown in the figures, that bends from the pipe spiral portion 62 and extends in a U shape inside of the pipe spiral portion 62, and a pipe tip end portion, not shown in the figures, that is inserted into the through hole 31 in the other sub-tank support portion 17.

A cross-section of the heat exchange pipe 60 is formed in the shape of a circular ring in both the pipe base end portion 61 and the pipe tip end portion. Hence, gaps are not formed in an insertion portion that is inserted into the through hole 31 in the sub-tank support portion 17, and as a result, leakage of the heat exchange medium is prevented.

In the pipe spiral portion 62, the cross-section of the heat exchange pipe 60 is formed in the shape of a non-circular ring. As a result, a contact area by which the heat exchange pipe 60 contacts the hydrogen storage material 9 is increased.

Figure 4:
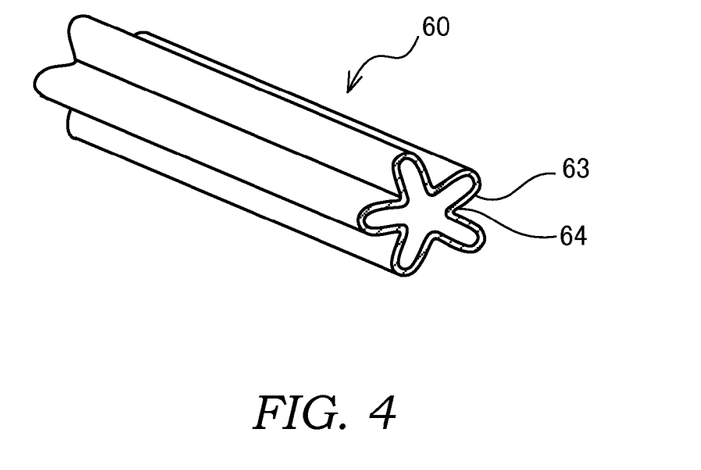
FIG. 4 is a perspective view showing a heat exchange pipe of the hydrogen storage container according to the other embodiment of this invention.

More specifically, as shown in FIG. 4, the heat exchange pipe 60 is formed with an annular sectional shape having a plurality of pipe projections 63 projecting radially toward an outer periphery and a plurality of pipe indentations 64 serving as recesses between adjacent pipe projections 63. Here, the heat exchange pipe 60 has five pipe projections 63 and four pipe indentations 64.

In other words, the heat exchange pipe 60 is formed in an annular shape in which the pipe projections 63 having a cross-section that projects in a U shape and the pipe indentations 64 having an identical cross-section that is recessed in a U shape are arranged alternately in a circumferential direction.

The pipe projections 63 and the pipe indentations 64 extend rectilinearly in a lengthwise direction serving as an axial direction of the heat exchange pipe 60.

The heat exchange pipe 60 is formed from a metallic material such as stainless steel, for example.

Similarly to the heat exchange pipe 50 of the above embodiment, the heat exchange medium led into the heat exchange pipe 60 performs heat exchange with the hydrogen storage material 9 via the heat exchange pipe 60. As a result, the hydrogen storage material 9 is cooled and heated.

In this embodiment, the heat exchange pipe 60 has an annular cross-section on which the plurality of pipe projections 63 project radially to the outer periphery. Therefore, the heat exchange pipe 60 has a larger surface area, or in other words a larger contact area with the hydrogen storage material 9, than the heat exchange pipe 50 having the circular ring-shaped cross-section according to the embodiment described above, assuming that respective flow passage sectional areas thereof are equal. Accordingly, an amount of heat exchanged by the heat exchange performed with the hydrogen storage material 9 is increased. Hence, the hydrogen storage material 9 can be cooled and heated more efficiently, and as a result, the hydrogen gas can be stored and discharged in and from the hydrogen storage material 9 quickly.

Further, the heat exchange pipe 60 is configured to have an annular cross-section on which the plurality of pipe projections 63 project radially to the outer periphery, and therefore the strength of the heat exchange pipe 60 relative to vibration and impacts can be increased.

Figure 5:
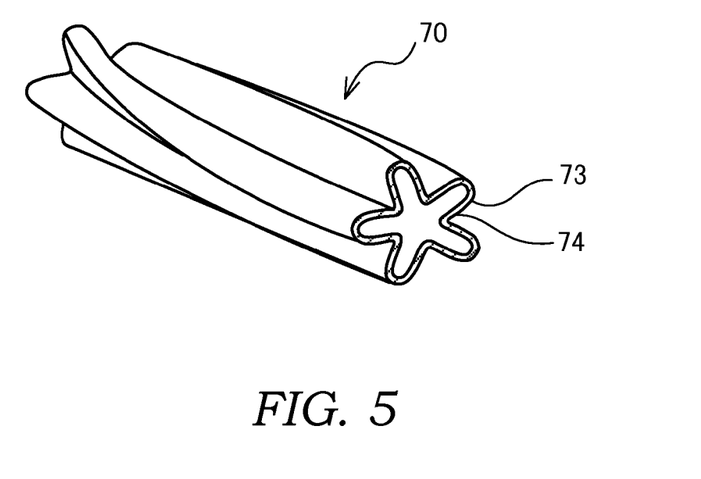
FIG. 5 is a perspective view showing a heat exchange pipe of a hydrogen storage container according to a further embodiment of this invention.

Next, referring to FIG. 5, a further embodiment will be described. In this embodiment, as shown in FIG. 5, pipe projections 73 and pipe indentations 74 of a heat exchange pipe 70 are configured to extend spirally along a lengthwise direction serving as an axial direction of the heat exchange pipe 70.

In this embodiment, the surface area of the heat exchange pipe 70, or in other words the contact area with the hydrogen storage material 9, can be increased even further in comparison with the heat exchange pipe 60 according to the embodiment described above, in which the pipe projections 63 and the pipe indentations 64 extend rectilinearly, assuming that the respective flow passage sectional areas thereof are equal.

Further, a flow speed in a tip end region of the pipe projections 73 is increased by centrifugal force acting on the heat exchange medium flowing spirally through the heat exchange pipe 70, and therefore the amount of heat exchanged by the heat exchange performed between the heat exchange medium and the hydrogen storage material 9 can be increased. Hence, the hydrogen storage material 9 can be cooled and heated more efficiently, and as a result, the hydrogen gas can be stored and discharged in and from the hydrogen storage material 9 quickly.

Although the invention has been described above with reference to certain embodiments, the invention is not limited to the embodiments described above. Modifications and variations of the embodiments described above will occur to those skilled in the art, within the scope of the claims.

This application claims priority based on Japanese Patent Application No. 2011-147548 filed with the Japan Patent Office on Jul. 1, 2011, the entire contents of which are incorporated into this specification.

The embodiments of this invention in which an exclusive property or privilege is claimed are defined as follows:

1. A hydrogen storage container that is configured to store hydrogen gas using a hydrogen storage material capable of storing hydrogen gas, the hydrogen storage container comprising:
   a hollow liner that is configured to store the hydrogen gas and includes a liner opening portion into which the hydrogen gas is introduced;
   a hollow sub-tank disposed inside the liner to house the hydrogen storage material;
   a heat exchange pipe which is disposed inside the sub-tank and through which a heat exchange medium passes;
   a sub-tank support portion that supports an end portion of the sub-tank relative to the liner opening portion and supports an end portion of the heat exchange pipe; and
   a heat exchange medium passage that is formed to penetrate the sub-tank support portion and leads the heat exchange medium to the heat exchange pipe, wherein
   the liner includes a pair of liner opening portions,
   the sub-tank is supported by the respective liner opening portions at both ends via a pair of sub-tank support portions,
   respective end portions of the heat exchange pipe are inserted into the heat exchange medium passage and supported by the respective sub-tank support portions, and
   each of the respective sub-tank support portion is provided with a hydrogen gas passage, the hydrogen gas passage being configured to allow the hydrogen gas to enter and exit therethrough.

2. A hydrogen storage container that is configured to store hydrogen gas using a hydrogen storage material capable of storing hydrogen gas, comprising:
   a hollow liner that is configured to store the hydrogen gas and includes a liner opening portion into which the hydrogen gas is introduced;
   a hollow sub-tank disposed inside the liner to house the hydrogen storage material;
   a heat exchange pipe which is disposed inside the sub-tank and through which a heat exchange medium passes;
   a sub-tank support portion that supports an end portion of the sub-tank relative to the liner opening portion and supports an end portion of the heat exchange pipe; and
   a heat exchange medium passage that is formed to penetrate the sub-tank support portion and leads the heat exchange medium to the heat exchange pipe, wherein
   the liner includes a pair of liner opening portions,
   the sub-tank is supported by the respective liner opening portions at both ends via a pair of sub-tank support portions,
   respective end portions of the heat exchange pipe are supported by the respective sub-tank support portions, and
   the heat exchange pipe includes:
   a pipe spiral portion that bends from a pipe base end portion projecting from one of the sub-tank support portions and extends in a coil shape; and
   a pipe reciprocating portion that bends from a tip end of the pipe spiral portion, extends in a U shape on an inner side of the pipe spiral portion, and has a pipe tip end portion on a tip end thereof that is inserted into the other sub-tank support portion.

3. The hydrogen storage container as defined in claim 1, wherein
   the heat exchange pipe includes a plurality of pipe projections that extend in a lengthwise direction of the heat exchange pipe, and
   the heat exchange pipe has a cross-sectional shape in which the plurality of pipe projections project radially toward an outer periphery of the heat exchange pipe.

4. The hydrogen storage container as defined in claim 3, wherein the pipe projections extend spirally in the lengthwise direction of the heat exchange pipe.

* * * * *